United States Patent
Gomez et al.

(10) Patent No.: US 9,275,763 B2
(45) Date of Patent: Mar. 1, 2016

(54) NUCLEAR FUEL ROD SPACER GRID AND FRAMEWORK AND ASSEMBLY COMPRISING SUCH A GRID

(75) Inventors: Noemie Gomez, Villeurbanne (FR); Angelo Beati, Lyons (FR); Dominique Hertz, Sainte Foy les Lyon (FR); Thierry Muller, St. Helene (FR)

(73) Assignee: AREVA NP, Courbevoie (FR)

( * ) Notice: Subject to any disclaimer, the term of this patent is extended or adjusted under 35 U.S.C. 154(b) by 1311 days.

(21) Appl. No.: 12/741,572

(22) PCT Filed: Oct. 30, 2008

(86) PCT No.: PCT/FR2008/051959
§ 371 (c)(1),
(2), (4) Date: May 5, 2010

(87) PCT Pub. No.: WO2009/060152
PCT Pub. Date: May 14, 2009

(65) Prior Publication Data
US 2010/0246747 A1 Sep. 30, 2010

(30) Foreign Application Priority Data
Nov. 5, 2007 (FR) .................................... 07 58790

(51) Int. Cl.
*G21C 3/34* (2006.01)
*G21C 3/352* (2006.01)
*G21C 3/334* (2006.01)

(52) U.S. Cl.
CPC *G21C 3/34* (2013.01); *G21C 3/334* (2013.01); *G21Y 2002/302* (2013.01); *G21Y 2004/30* (2013.01); *Y02E 30/40* (2013.01)

(58) Field of Classification Search
USPC ................................. 376/438, 441, 442, 444
See application file for complete search history.

(56) References Cited

U.S. PATENT DOCUMENTS

| 4,297,170 A | 10/1981 | Leclercq |
| 5,084,237 A * | 1/1992 | Patterson et al. ............. 376/442 |
| 5,104,609 A | 4/1992 | Okuyama et al. |
| 5,434,898 A | 7/1995 | Barkhurst |

FOREIGN PATENT DOCUMENTS

| FR | 2 426 312 | 12/1979 |
| FR | 2 639 139 A1 | 5/1990 |
| FR | 2 785 712 | 5/2000 |

* cited by examiner

*Primary Examiner* — Jack W Keith
*Assistant Examiner* — Sean P Burke
(74) *Attorney, Agent, or Firm* — Davidson, Davidson & Kappel, LLC

(57) ABSTRACT

A grid including at least two meshed grid parts intended to be superposed in a longitudinal direction, each grid part extending in a transverse plane, and the grid parts being moveable one relative to the other in at least one transverse direction between an open configuration for the insertion of nuclear fuel rods in the longitudinal direction through the grid parts, and a closed configuration allowing each fuel rod inserted through the grid parts to be clamped transversely between the grid parts. According to one aspect of the invention, the grid includes elements for transversely immobilizing the grid parts in the closed configuration, the immobilizing elements being designed to engage as the superposed grid parts are moved closer together in the longitudinal direction.

20 Claims, 11 Drawing Sheets

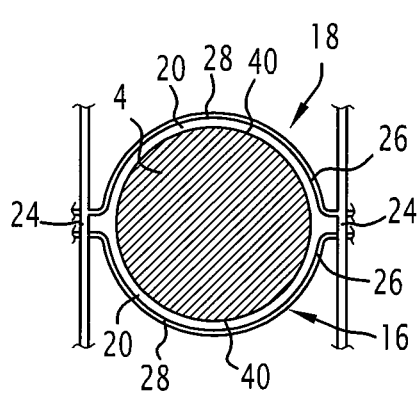
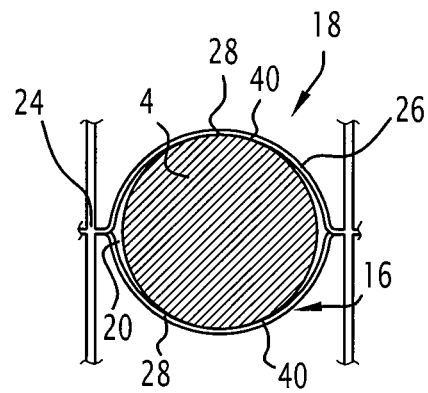
FIG.6  FIG.7
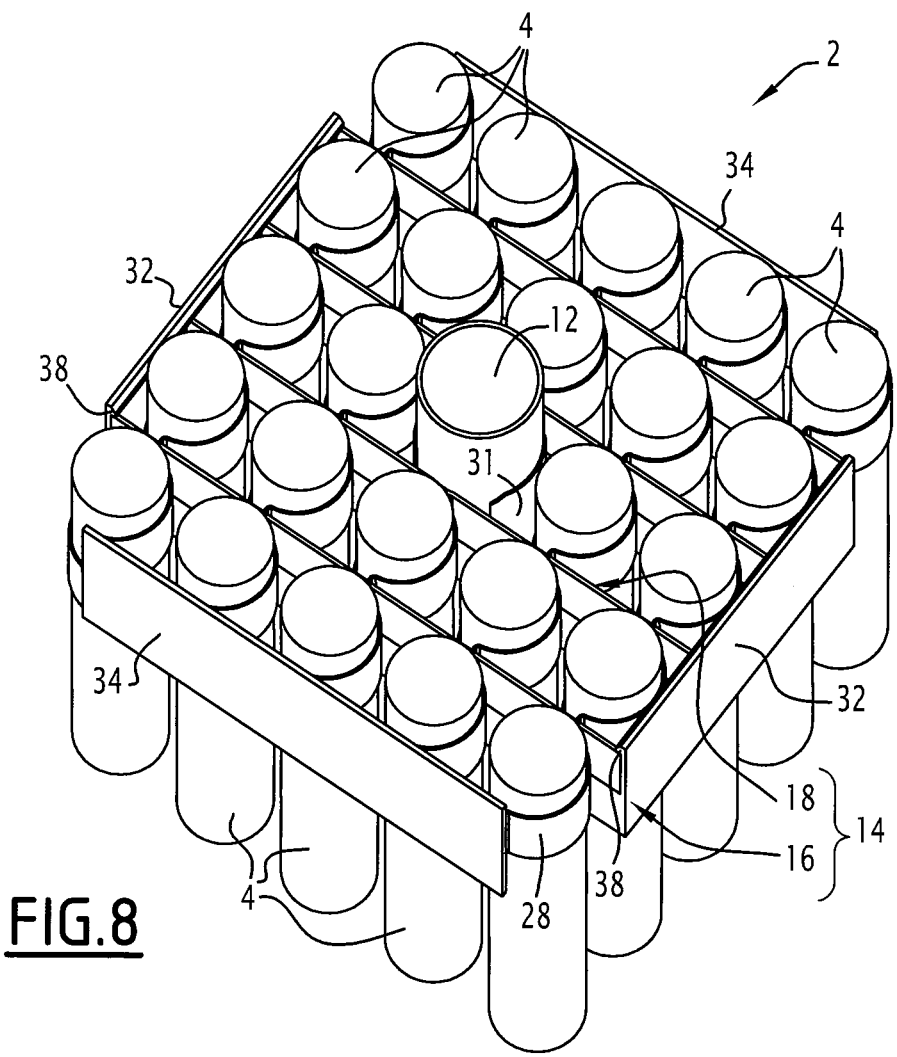
FIG.8

NUCLEAR FUEL ROD SPACER GRID AND FRAMEWORK AND ASSEMBLY COMPRISING SUCH A GRID

The present invention relates to a nuclear fuel rod spacer grid for a fuel assembly, of the type comprising at least two meshed grid parts which are to be superposed in a longitudinal direction, each grid part extending in a transverse plane, the grid parts being movable relative to one another in at least one transverse direction between an open configuration for insertion of nuclear fuel rods in the longitudinal direction through the grid parts, and a closed configuration allowing each rod inserted through the grid parts to be clamped transversely between the grid parts.

BACKGROUND

FR 2 639 139 A1 describes a nuclear fuel rod spacer grid for a light water reactor, comprising two grid parts with dimples and one grid part with springs, which grid parts can be offset for the longitudinal insertion of the rods through the grid or aligned in order to clamp the rods between the grid parts. The grid comprises an outer frame produced in two parts for holding the grid parts in the rod clamping configuration.

The use of this grid requires a special tool for holding the grid parts in the rod insertion configuration and in the rod clamping configuration, and for fixing the frame.

SUMMARY OF THE INVENTION

An object of the invention is to provide a nuclear fuel rod spacer grid which is easy to use.

To that end, the invention provides a nuclear fuel rod spacer grid of the type mentioned above, characterized in that it comprises elements for transversely immobilizing the grid parts in the closed configuration, which elements are arranged to come into engagement as the superposed grid parts are brought together in the longitudinal direction.

According to other embodiments of the invention, the nuclear fuel rod spacer grid has one or more of the following features, taken in isolation or in any technically possible combinations:

the grid parts have members for locking the grid parts longitudinally in the closed configuration;

locking members are fixed to one grid part and are capable of snapping onto the other grid part as the grid parts are brought together in the longitudinal direction;

immobilization elements comprise peripheral walls which are fixed to one grid part and define, between them and with that grid part, a space for receiving the other grid part, into which space the other grid part can be fitted;

when viewed in the longitudinal direction, the grid parts have a polygonal peripheral contour, the peripheral walls comprising at least one pair of peripheral walls which are fixed to one grid part and extend along opposite sides of that grid part;

at least one peripheral wall fixed to one grid part carries a tooth for locking the grid parts in the closed configuration, which tooth is capable of snapping onto the other grid part as the grid parts are brought together;

the grid parts define at least one passage for a guide thimble for receiving a cluster rod, at least one of the grid parts being capable of receiving the or each guide thimble with transverse clearance in at least one transverse direction of clamping of the rods between the grid parts;

each grid part is formed of first plates and second plates which intersect with the first plates;

it comprises a first pair of grid parts provided for clamping rods in a first transverse direction, and a second pair of grid parts for clamping those rods in a second transverse direction that is different from the first transverse direction;

one grid part of the first pair of grid parts is fixed to one grid part of the second pair of grid parts.

The invention relates also provides a nuclear fuel rod spacer framework for a nuclear fuel assembly, comprising a plurality of spacer grids for rods of a bundle of rods, which spacer grids are to be distributed along the rods at a distance from one another, characterized in that at least one of the spacer grids is a spacer grid as defined above.

The invention also provides a nuclear fuel assembly comprising a bundle of nuclear fuel rods and a spacer framework for the rods as defined above.

BRIEF DESCRIPTION OF THE DRAWINGS

The invention and its advantages will be better understood upon reading the following description, which is given solely by way of example and with reference to the accompanying drawings, in which:

FIGS. 6 and 7 are partial top views of the grid of FIGS. 2 and 3, in the open and closed configurations;

FIG. 8 is a perspective view of the grid of FIGS. 2 and 3, in the closed configuration, and of nuclear fuel rods;

DETAILED DESCRIPTION

Figure 1:
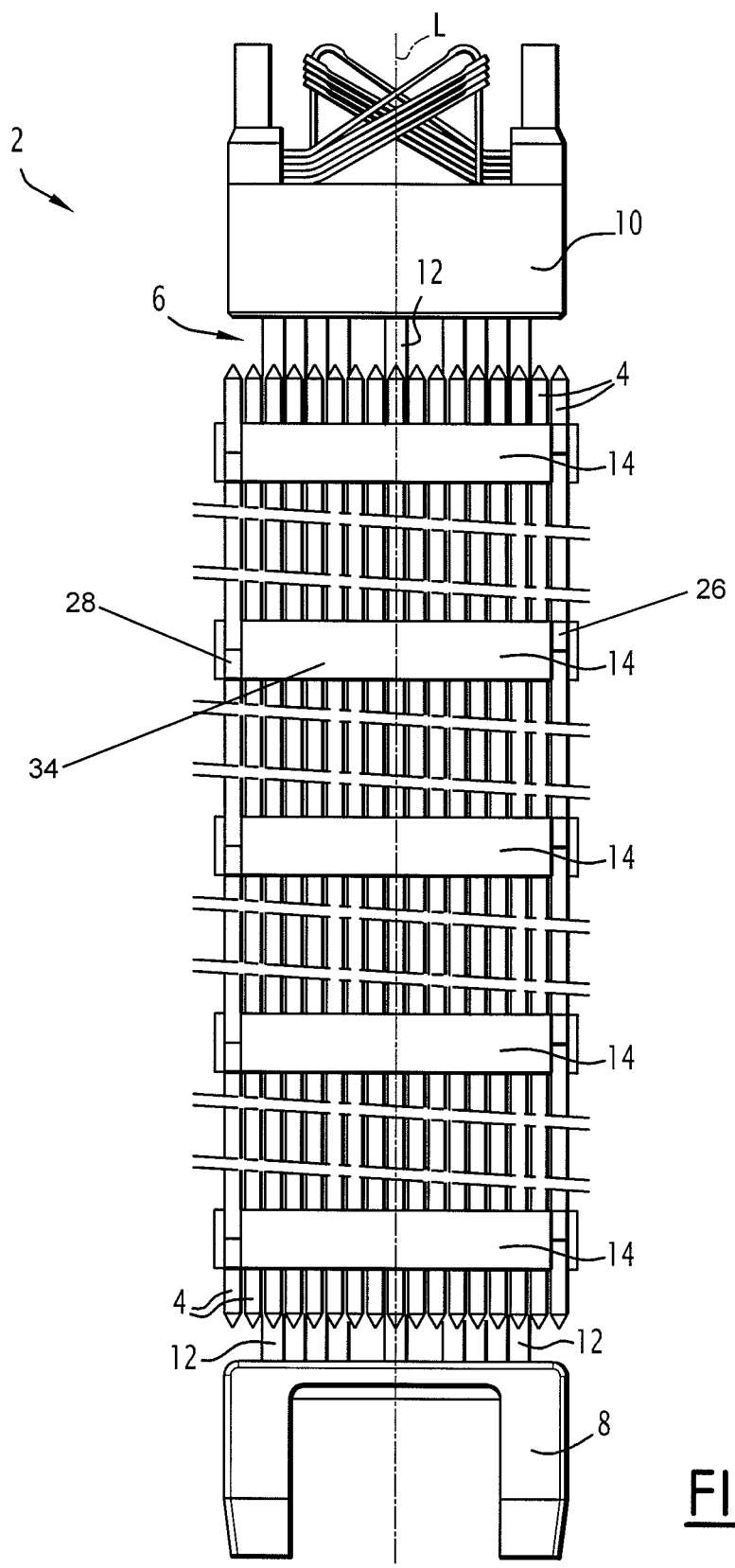
FIG. 1 is a side elevational view of a nuclear fuel assembly for a pressurized water nuclear reactor.

In order to illustrate the context of the invention, FIG. 1 shows, in diagrammatic form, a nuclear fuel assembly 2 for a pressurized water reactor.

In this type of reactor, during operation, light water serves as the moderator for the nuclear reaction and as the coolant for the heat exchanges.

The assembly 2 extends in a longitudinal direction L, which is intended to be vertical when the assembly 2 is disposed in the core of a nuclear reactor. That direction is the main direction of flow of the water.

The assembly 2 comprises, in known manner, a bundle of nuclear fuel rods 4 containing the fissile material, and a framework 6 for supporting and holding the rods 4.

The framework 6 conventionally comprises a bottom end-piece 8, a top end-piece 10, guide thimbles 12, and grids 14 for holding the rods 4.

The bottom end-piece 8 and the top end-piece 10 are arranged at the longitudinal ends of the assembly 2.

The guide thimbles 12 extend longitudinally between the end-pieces 8, 10 and are fixed at their longitudinal ends to the end-pieces 8, 10. Accordingly, the guide thimbles 12 connect the end-pieces 8 and 10 together.

In a conventional manner, the guide thimbles 12 are to receive, through their open top ends, cluster rods which do not contain fissile material, the presence or insertion of which to a greater or lesser extent allows the nuclear reaction to be controlled.

In an alternative embodiment, at least one of the guide thimbles is replaced by an instrumentation tube which is to permit the insertion, through its open bottom end, of a reactor instrumentation device.

The grids 14 are fixed to the guide thimbles 12 and distributed along the guide thimbles 12, between the end-pieces 8, 10. The grids 14 have analogous structures and can exhibit variations according to their longitudinal position: presence or absence of mixing vanes, guide vanes, outer straps, etc.

The rods 4 are disposed longitudinally in a bundle and pass through the grids 14. The grids 14 serve to hold the rods 4 on the frame 6. The rods 4 terminate at a distance from the end-pieces 8, 10.

The grids 14 keep the rods 4 and the guide thimbles 12 apart in order to allow pressurized water to flow in direction L, through the assembly, between the rods 4.

A conventional grid for a pressurized water reactor fuel assembly defining a square-base system has, for example, between 14 and 19 cells on each of its sides, a plurality of cells for receiving guide thimbles distributed in the system, and, optionally, a central cell for receiving an instrumentation tube.

A conventional grid for a boiling water reactor fuel assembly defining a square-base system has, for example, between 6 and 13 cells on each of its sides and at least one cell for receiving a water channel which replaces from 1 and up to 5×5 fuel rods and is generally disposed relatively centrally.

The invention will now be described with reference to FIGS. 2 to 8, which show a grid 14 which is analogous to those of FIG. 1 but is limited, for reasons of clarity of the drawings, to one system designed to receive a smaller number of rods as compared with a conventional grid.

Figure 2:
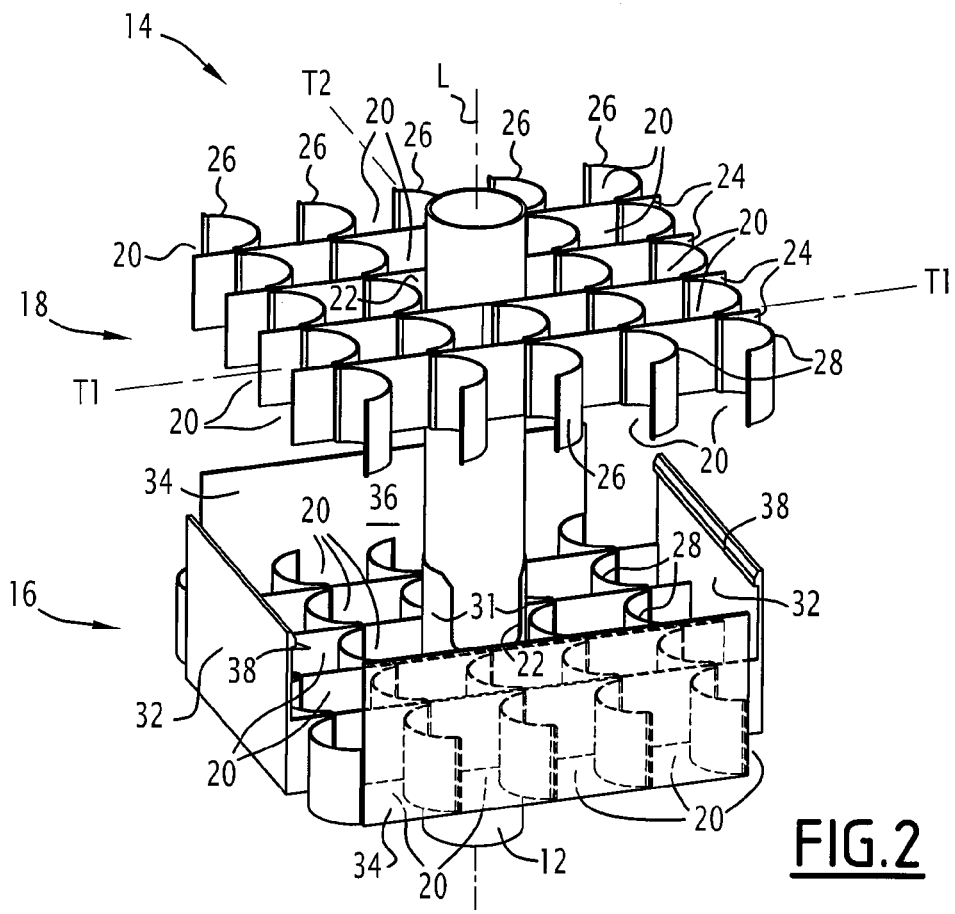
FIGS. 2 and 3 are perspective views of a nuclear fuel rod spacer grid according to the invention, in the open and closed configurations.
Figure 3:
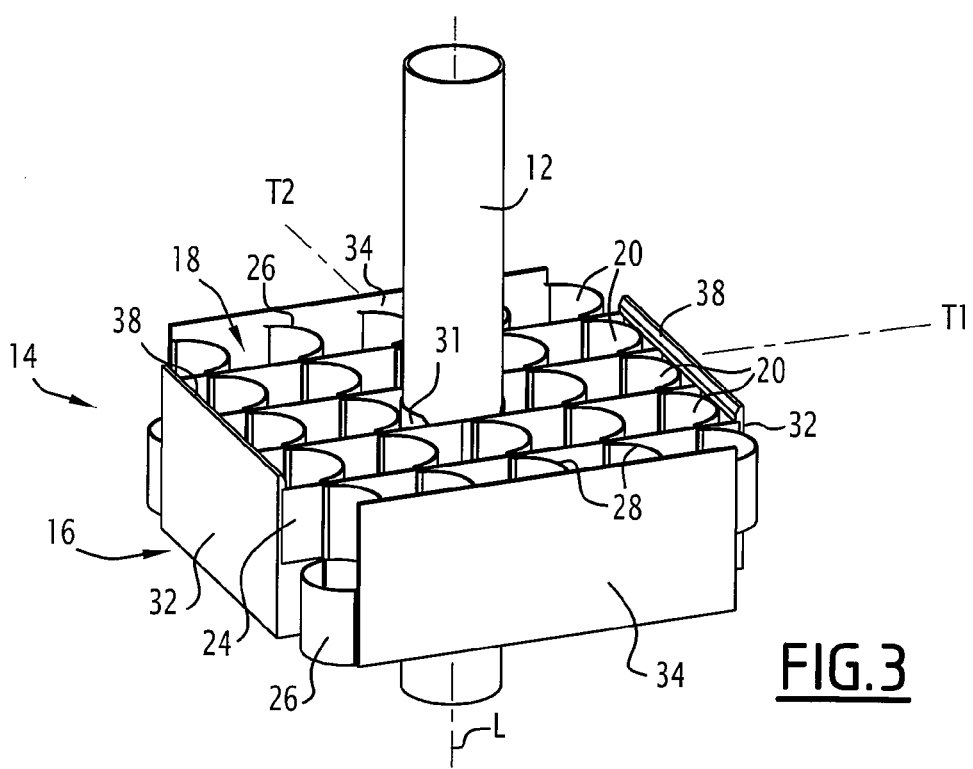

As shown in FIGS. 2 and 3, the grid 14 comprises a first grid part 16 and a second grid part 18, which parts are separate.

The grid parts 16, 18 are movable relative to one another in direction L, between an open configuration (FIG. 2) for insertion of nuclear fuel rods through the grid 14 in direction L, and a closed configuration (FIG. 3) for clamping the nuclear fuel rods between the grid parts 16, 18.

As shown in FIG. 2, each of the grid parts 16, 18 is of the meshed type and defines a system of cells comprising cells 20 for receiving nuclear fuel rods, and a cell 22 for receiving a guide thimble 12.

In the example shown, each grid part 16, 18 defines a square-base system having five cells on each of its sides. The cell 22 for receiving a guide thimble 12 is the central cell, and the other cells 20 are cells for receiving nuclear fuel rods.

In the open configuration, a rod 4 is able to pass through each cell 20 substantially without being clamped.

In the open configuration (FIG. 2), the grid parts 16 and 18 extend transversely to direction L and are superposed in direction L, so that each cell 20 of one grid part is superposed with a cell 20 of the other grid part in order to allow a nuclear fuel rod to be inserted in direction L through each pair of superposed cells 20.

Each grid part 16, 18 comprises first inner spacer plates 24 which intersect with second inner support plates 26, defining between them the cell system.

The spacer plates 24 are substantially flat and extend in a first transverse direction T1. The support plates 26 have a curved shape and extend generally in a second transverse direction T2, which is perpendicular to direction T1.

In the example shown, each of the support plates 26 comprises a plurality of substantially semi-cylindrical support portions 28, the axis of which is parallel to direction L.

Each support portion 28 has a support face which defines in part a wall of a cell 20 and is to come to bear on a rod in order to clamp it. The support faces of the support portions 28 are here their concave faces.

The support faces of the support portions 28 of a support plate 26 are oriented on the same side of the plate 26, and the support faces of the support portions 28 of the support plates 26 of one grid part 16, 18 are oriented in the same transverse direction.

The spacer plates 24 cross the support plates 26 between the support portions 28 and maintain the spacing between the support plates 26.

Figure 4:
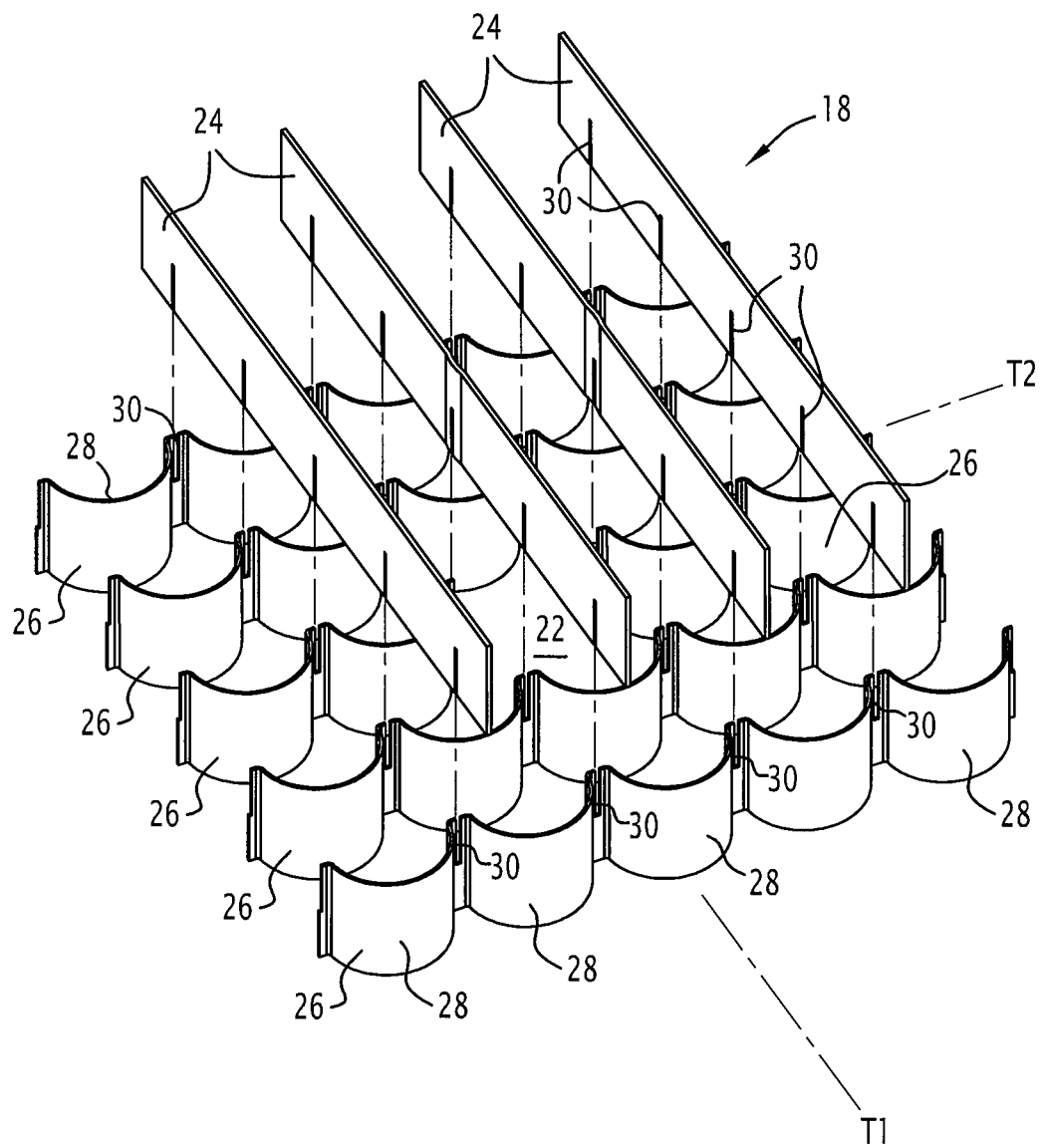
FIG. 4 is an exploded perspective view of a grid part of the grid of FIGS. 2 and 3.

As shown in FIG. 4, which is an exploded perspective view of the second grid part 18, the support plates 26 and the spacer plates 24 are equipped with complementary notches 30, which allow them to be fitted together.

The cell 22 of the second grid part 18 is larger than the guide thimble 12, in particular in direction T1, so that the second grid part 18 can be threaded onto the guide thimble 12 with transverse clearance.

Figure 5:
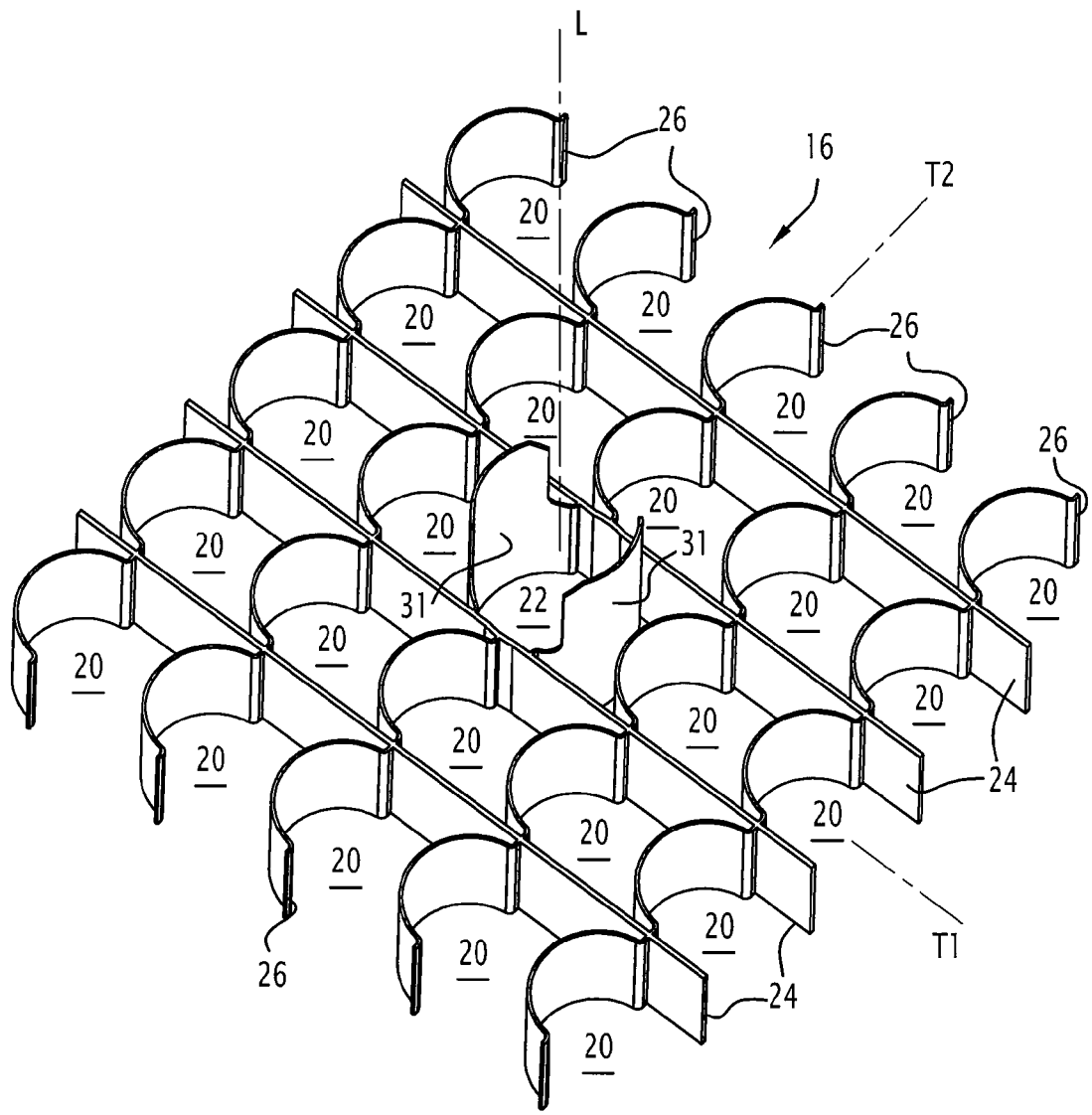
FIG. 5 is a perspective view of another grid part of the grid of FIGS. 2 and 3.

As shown in FIG. 5, the first grid part 16 comprises two tabs 31 on two of the first plates 24 delimiting the cell 22. The tabs 31 are in the form of portions of a cylinder whose axis is parallel to direction L.

The tabs 31 are integral with the plates 24. By way of variation, the tabs 31 are attached and fixed to the plates 24.

The tabs 31 are to receive the guide thimble 12 between them, substantially without transverse clearance, so that the first grid part 16 is transversely stationary relative to the guide thimble 12.

As shown in FIG. 2, the grid 14 comprises means for transversely immobilizing the grid parts 16, 18 relative to one another when the grid parts 16, 18 are in the closed configuration.

In the example shown, the transverse immobilization means comprise peripheral plates 32, 34 which surround the inner plates 24, 26 of the first grid part 16 and are fixed thereto. The peripheral plates 32, 34 are fixed to the ends of the inner plates 24, 26. Each peripheral plate 32, 34 extends on one side of the first grid part 16.

The peripheral plates 32, 34 terminate at a distance from one another and are not connected directly to one another at the corners of the first grid part 16. The peripheral cells 20 of the first grid part 16 are closed laterally by the peripheral plates 32, 34, with the exception of two corner cells 20, which are open laterally (on the right in FIG. 2).

By way of variation, the peripheral plates 32, 34 meet and are connected together, for example by welding, the four corner cells are closed. As a result, the rods received in the corner cells will be protected during handling operations.

The peripheral plates 32, 34 extend beyond the inner plates 24, 26 of the first grid part 16, in the direction towards the second grid part 18 disposed in the open configuration. They define, between them and with the upper edges of the inner plates 24, 26 of the first grid part 16, a space 36 for receiving the second grid part 18. The space 36 is complementary to the outer contour of the second grid part 18.

In the closed configuration (FIG. 3), the second grid part 18 is inserted in direction L into the space 36 and is immobilized transversely relative to the first grid part 16 by the peripheral plates 32, 34.

In the example shown, the peripheral plates 32, 34 extend over the whole of the height of the inner plates 24, 26 of the first grid part 16 and of the second grid part 18.

The grid 14 comprises locking means which are capable of fixing the grid parts 16, 18 longitudinally relative to one another and which are active when the grid 14 is in the closed configuration.

In the example shown, the locking means comprise locking teeth 38 which are provided to snap onto the upper edges of the inner plates 24, 26 of the second grid part 18 in the closed configuration (FIG. 3).

The teeth 38 are disposed on the top edges of a pair of peripheral walls 32 extending along opposite sides of the first grid part 16. The peripheral plates 32 project over a height (in direction L) which is slightly greater than the height of the plates 24, 26 of the second grid part 18.

The second grid part 18 does not have peripheral walls. Accordingly, the peripheral cells 20 of the second grid part 18 are open laterally in the open configuration (FIG. 2). Some of the peripheral cells 20 are closed by the peripheral walls 32, 34 of the first grid part 16 in the closed configuration (FIG. 3). In a variant where the peripheral plates 32, 34 meet at the four corners of the first grid part 16, the peripheral cells 20 of the second grid part 18 are all closed laterally.

Optionally, the peripheral plates 32, 34 comprise guide vanes which project from their bottom edge and/or from their top edge and which are inclined towards the centre of the grid, in order to effect guiding of the grid with the surrounding objects during handling operations.

The insertion of fuel rods through the grid 14 is described hereinbelow with reference to FIGS. 2, 3 and 6 to 8.

In order to join the two grid parts 16, 18 and insert the rods 4, the first grid part 16 and the second grid part 18 are threaded onto the guide thimble 12 and disposed in the open configuration (FIG. 2).

The grid parts 16 and 18 are oriented about direction L so that for each pair of cells 20 superposed in direction L of the grid parts, and the support faces of the support portions 28 delimiting the cells of said pair of cells are facing.

The tabs 31 are welded to the guide thimble 12. Accordingly, the first grid part 16 is longitudinally and transversely stationary relative to the guide thimble 12. The second grid part 18 slides longitudinally and is transversely movable at least in direction T1 relative to the guide thimble 12.

The second grid part 18 is then shifted transversely in direction T1 so that the support faces of the support portions 28 of the cells 20 of each pair of superposed cells 20 are moved apart in direction T1 in order to allow a rod 4 to be inserted, substantially without being clamped between the support faces of the support portions 28 (FIG. 6). To that end, the spacing between the support faces is greater than the diameter of the rods 4. Each rod 4 is inserted in direction L through a pair of superposed cells 20.

The grid parts 16 and 18 are then brought together in direction L until the second grid part 18 is inserted into the corresponding space 36 of the first grid part 16 (FIG. 8).

During the insertion, the peripheral walls 32, 34 guide the second grid part 18 so that the opposing support faces of the support portions 28 of the cells 20 of each pair of superposed cells 20 are brought together in direction T1 and clamp between them the rod 4 passing through those two cells 20 (FIG. 7).

The peripheral walls 32 are deformed resiliently and move apart during the insertion in order to allow the teeth 38 to slide along the first grid part 18 until the teeth 38 snap onto the first grid part 18 and oppose a reverse spreading movement of the grid parts 16 and 18.

It will be noted in FIGS. 6 and 7 that the support portions 28 have a radius of curvature, on their supporting face side, that is greater than the radius of curvature of the outer surface 40 of the rods 4. This ensures that the rod 4 is centred as the support portions 28 are brought together.

FIG. 8 shows the grid 14 in the closed configuration, the rods 4 passing through the grid 14.

In the embodiment of FIGS. 2 to 8, each rod 4 is clamped in a transverse direction (direction T1) between a support plate 26 of one of the grid parts 16, 18 and a support plate 26 of the other grid part.

The insertion of the rods 4 in the open configuration of the grid parts 16, 18 without clamping avoids friction of the rods 4 against the grid parts 16, 18 and the formation of recessed chips on the outer surface of the rods 4, which can impair the strength and longevity of the rods 4.

During movement in the closed configuration, the second grid part 18 moves longitudinally along the rods 4 and gradually clamps them. Nevertheless, this is effected over a reduced length, which is here substantially equal to the height of the second grid part 18.

The grid 14 is easy to install because the grid parts 16, 18 are joined simply by being brought together longitudinally, which causes the rods 4 to be clamped and the means for transversely immobilizing the grid parts 16, 18 in the closed clamping configuration (peripheral walls 32, 34) to be brought into engagement.

Bringing the grid parts 16, 18 together also causes the engagement of the means for locking the grid parts 16 and 18 in the closed clamping configuration (for example the teeth 38). By way of variation or optionally, longitudinal locking of the grid parts 16, 18 is obtained by fixing them together so that the grid cannot be taken apart, for example by welding the peripheral plates 32, 34 of the first grid part 16 to one or more inner plates of the second grid part 18 in several places.

Figure 9:
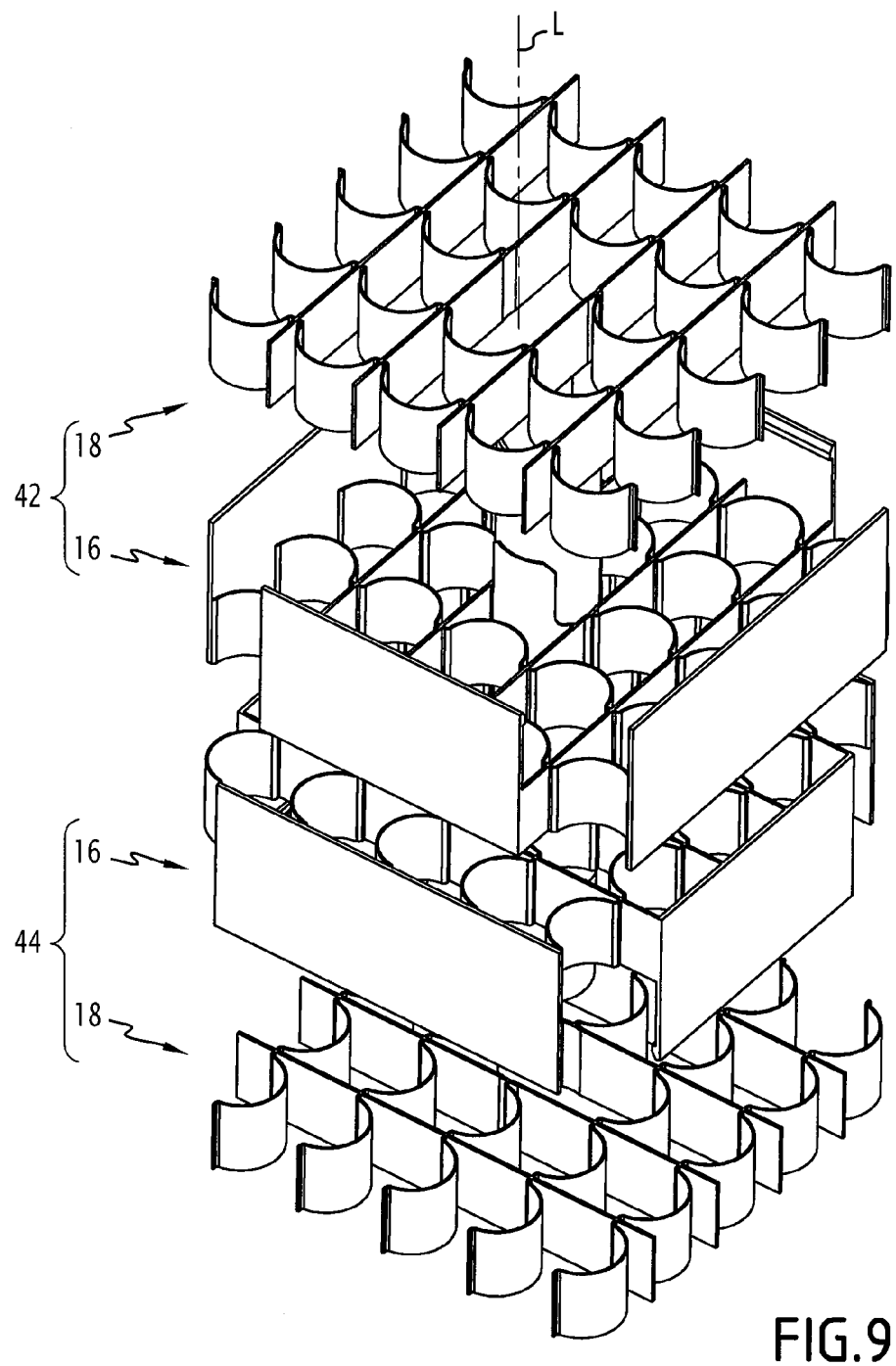
FIGS. 9 and 10 are perspective views of two nuclear fuel rod spacer grids, in the open and closed configurations of the grids.
Figure 10:
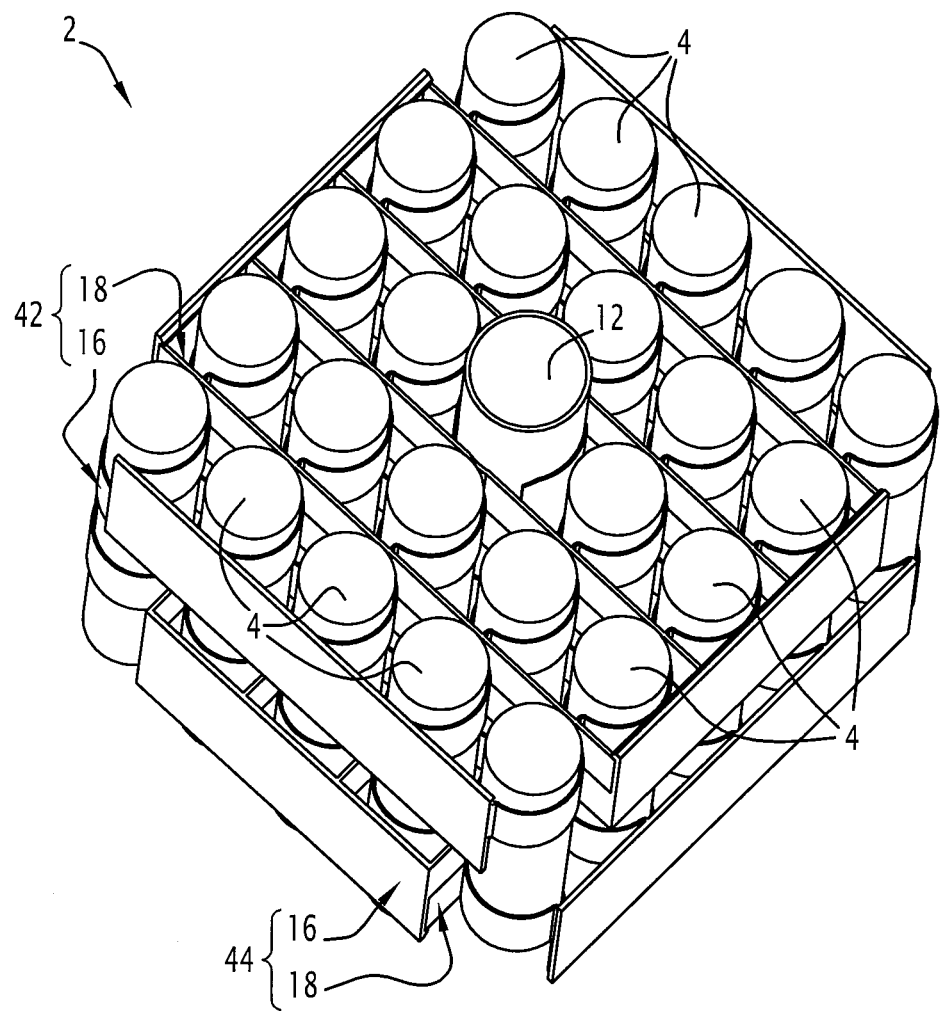

As shown in FIGS. 9 and 10, where references to elements similar to those in FIGS. 1 to 8 have been retained, two grids 44, 42 identical to the grid 14 of FIGS. 2 to 8 are superposed and offset by an angle of 90° about direction L in order to clamp the rods 4 in two different transverse directions.

As shown in FIG. 10, in an assembly, the grids 42, 44 are spaced in direction L. Furthermore, the grid 44 is turned round so that the second grid part 18 of the grid 42 fits into the corresponding first grid part 16 from the top, while the second grid part 18 of the grid 44 fits into the corresponding first grid part 16 from the bottom. This facilitates the movement of the second grid parts 18 in the clamping configuration when the longitudinal spacing between the grids 42, 44 is small.

Figure 11:
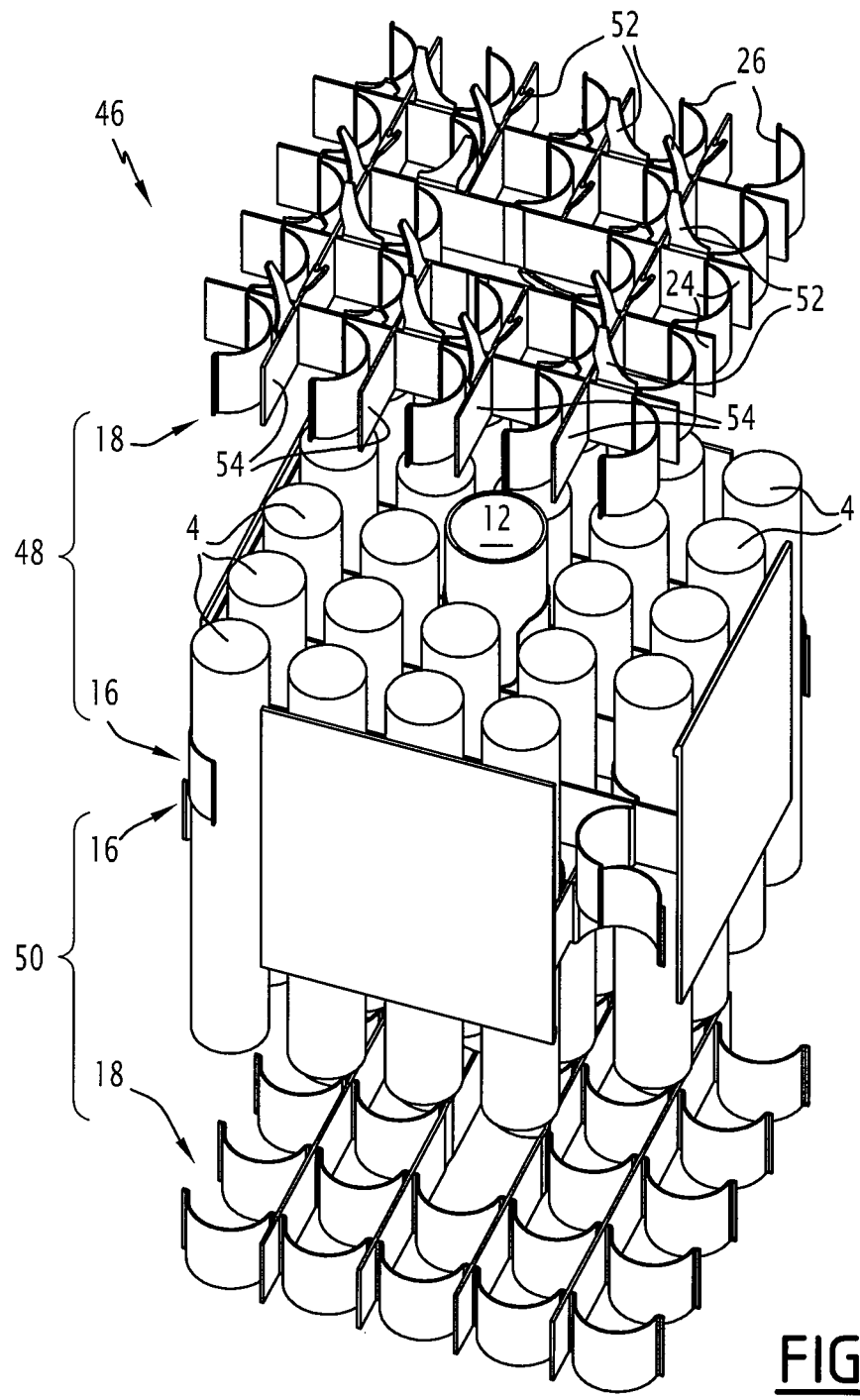
FIGS. 11 and 12 are perspective views of a nuclear fuel rod spacer grid according to an alternative embodiment, in the open and closed configurations.
Figure 12:
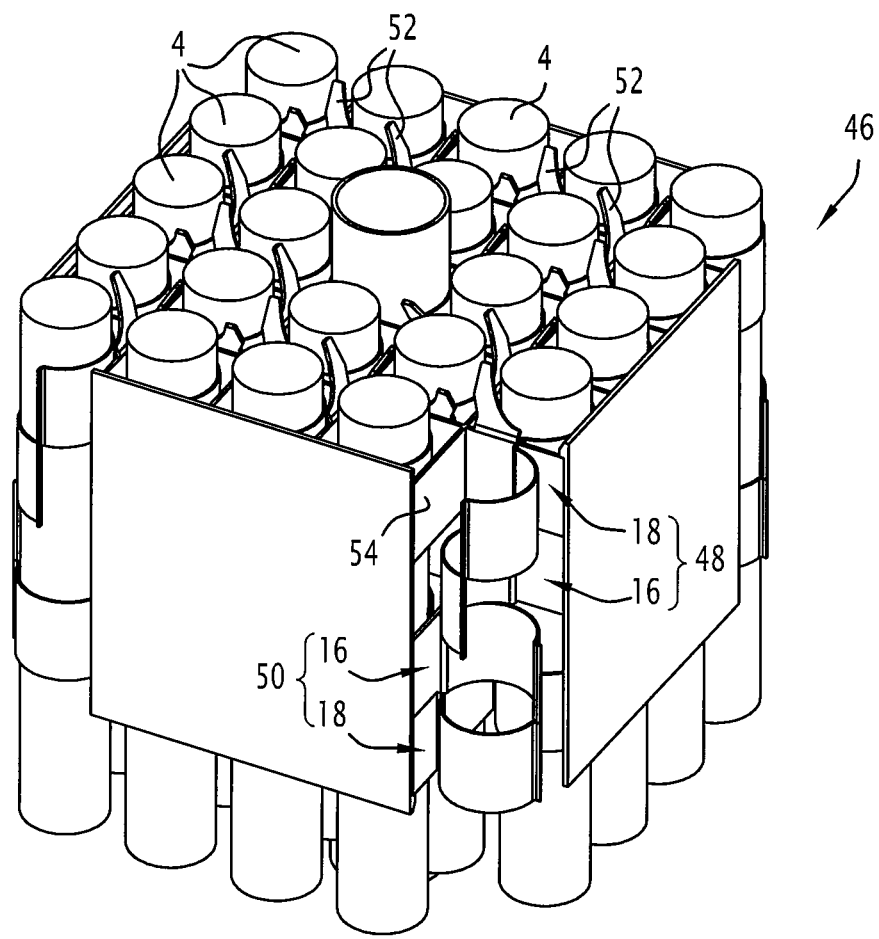

As shown in FIGS. 11 and 12, a grid 46 corresponds to the joining of the grids 42, 44 of FIGS. 9 and 10.

There is accordingly obtained a grid 46 having two stages 48, 50, each of which is formed by a first grid part 16 and a second grid part 18 which are capable of cooperating in order to clamp each rod in a transverse direction, the two stages being capable of clamping the rods in different (here perpendicular) directions.

Optionally, and as shown in FIGS. 11 and 12, the grid 46 has vanes 52 for mixing a coolant flowing between the rods 4, the vanes 52 projecting upwards from the grid 46.

More precisely, the vanes 52 are fixed to the second grid part 18 of the top stage 48, to the top edges of the spacer plates 24 and to the top edges of substantially flat auxiliary vane support plates 54, and extend perpendicularly to the spacer plates 24.

The provision of mixing vanes is not limited to grids having two stages. Vanes may optionally also be provided on a grid having a single stage, such as that of FIG. 8.

The shape of the support portions 28 according to the example of FIGS. 2 to 8 allows a large support surface to be obtained while the loss of pressure of the grid 14 is limited, i.e. its resistance to the flow of a fluid through the grid 14 is limited.

However, the shape of the support portions 28 is not limited to the example of FIGS. 2 to 8. The support portions 28 can have different shapes. The support portions 28 of two grid parts of a grid can be different. This is illustrated in FIGS. 13 to 18.

Figure 13:
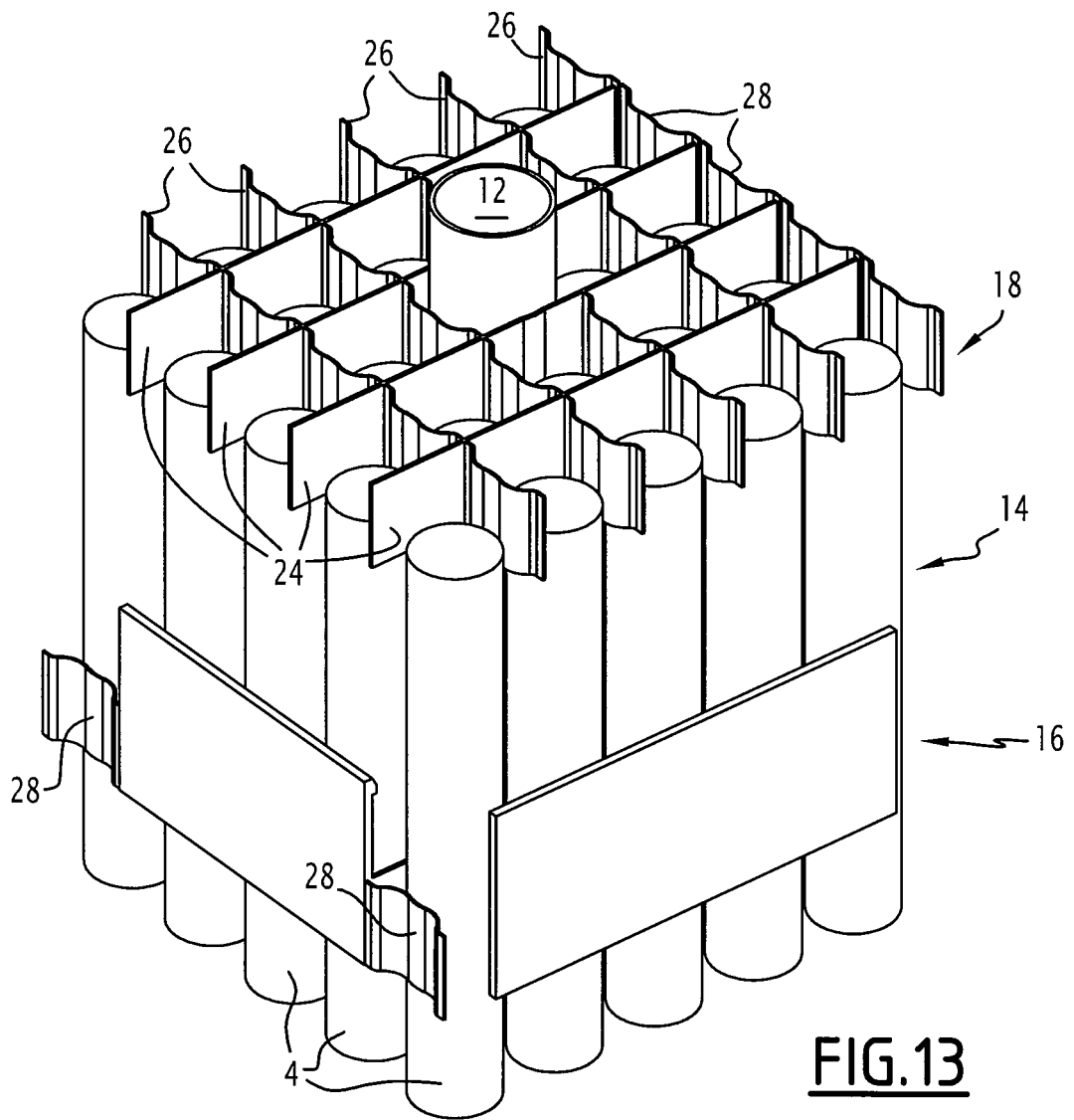
FIG. 13 is a perspective view of a nuclear fuel rod spacer grid according to an alternative embodiment in the open configuration.

As shown in FIG. 13, where references to elements similar to those of FIGS. 2 to 8 have been retained, a grid 14 differs from the grid of FIGS. 2 to 8 in the shape of the support portions 28 of the grid parts 16 and 18.

Figure 14:
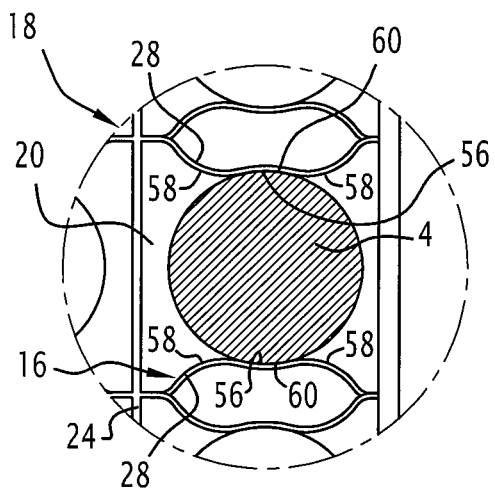
FIGS. 14 to 18 are partial top views of nuclear fuel rod spacer grids according to alternative embodiments.

As can be seen more clearly in FIG. 14, in a view in direction L, each support portion 28 has the general shape of a rounded W. The support face comprises a concave support zone 56 surrounded by two convex zones 58.

When a rod 4 is inserted into aligned cells 20 of the grid parts 16, 18, and when the grid parts 16, 18 are in the closed configuration, the grid 14 bears on the rod 4 in two diametrically opposite zones 60.

Figure 15:
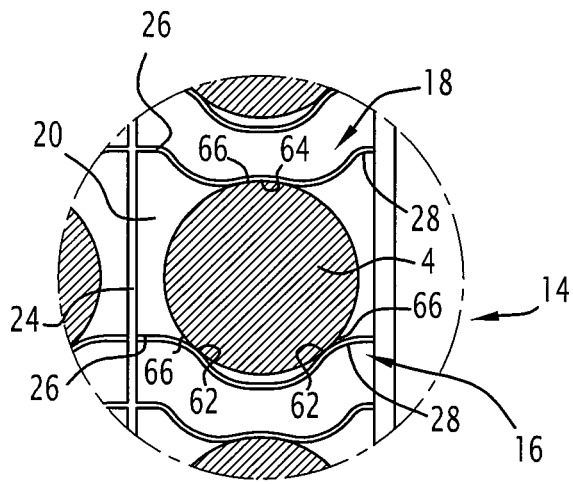

In a variant shown in FIG. 15, the support portions 28 are different. When viewed in direction L, each of the support portions 28 of the first grid part 16 has on its support face two spaced concave support zones 62, and each of the support portions 28 of the second grid part 18 has on its support face a concave support zone 64.

When a rod 4 is inserted into aligned cells 20 of the grid parts 16, 18, and when the grid parts 16, 18 are in the closed configuration, the grid 14 bears on the rod 4 in three zones 66 which are spaced circumferentially.

Figure 16:
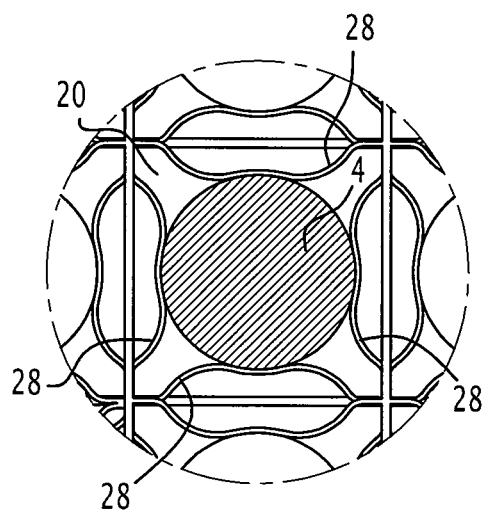

FIG. 16 shows a grid having two stages, analogous to that of FIGS. 11 and 12, the grid parts 16, 18 of which have support portions 28 which are identical to those of FIG. 14.

Figure 17:
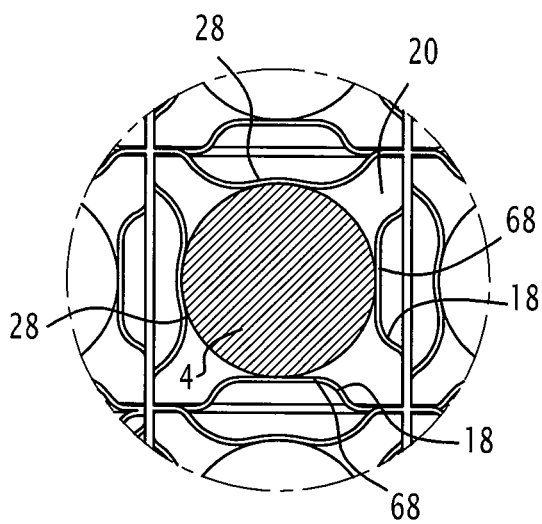

FIG. 17 shows a two-stage grid having two second grid parts 18 equipped with support portions 28 which are identical to those of FIG. 14, which has a certain degree of resilience radially to the rod 4 and forms springs, and two first grid parts 18 equipped with support portions each having a single flat support zone 68, which is similar to a boss, which are more rigid than the springs.

Figure 18:
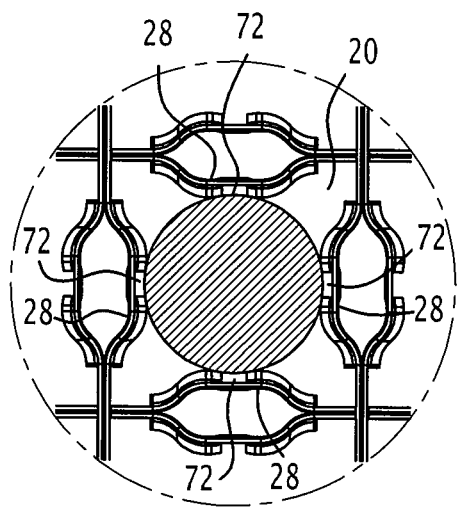

FIG. 18 shows a two-stage grid, the grid parts of which have support portions 28, each of which has, on its support face, a concave support zone 70 provided with a slot 72 which extends in direction L (perpendicular to the plane of FIG. 18). The presence of the slot 72 allows the resilience of the support portion 28 to be adjusted.

The grid parts are made of any suitable material, especially of metal, such as zirconium-based alloys, nickel-based alloys etc.

The invention is not limited to the examples which have been described. In particular, the walls or the support zones defining bosses and springs can have any suitable shapes.

Furthermore, the grid parts of a grid are locked in the closed configuration by any suitable means, such as by snap-in raised portions (teeth 38) or by welding.

The invention is applicable to grids for a nuclear fuel assembly for a light water nuclear reactor, such as pressurized water reactors (PWR) and boiling water reactors (BWR). In the latter case, each grid defines at least one longitudinal passage for a water flow channel, for example by replacing a guide thimble of a grid for a PWR-type assembly.

The invention claimed is:

1. A nuclear fuel rod spacer grid for a fuel assembly, the nuclear fuel rod spacer grid comprising at least two meshed grid parts including a first grid part and a second grid part, the first and second grid parts being superposed in a longitudinal direction, each of the first and second grid parts extending in a transverse plane, the first and second grid parts being movable relative to one another in at least one transverse direction between an open configuration for insertion of nuclear fuel rods in the longitudinal direction through the first and second grid parts, and a closed configuration allowing each rod inserted through the first and second grid parts to be clamped transversely between the grid parts, and immobilization elements for transversely immobilizing the first and second grid parts in the closed configuration, the immobilization elements being arranged to come into engagement as the superposed first and second grid parts are brought together in the longitudinal direction, each rod being clamped transversely between a support plate of the first grid part and a support plate of the second grid part in the closed configuration.

2. The grid according to claim 1 wherein the first and second grid parts have members for locking the grid parts longitudinally in the closed configuration.

3. The grid according to claim 2 wherein the locking members are fixed to the first grid part and are capable of snapping onto the second grid part as the first and second grid parts are brought together in the longitudinal direction.

4. The grid according to claim 1 wherein the immobilization elements comprise peripheral walls fixed to the first grid part and defining a space between the peripheral walls and the second grid part, the space for receiving the second grid part, the second grid part being finable into the space.

5. The grid according to claim 4 wherein when the grid is viewed in the longitudinal direction, imaginary straight lines passing along an outer periphery of each side of the grid parts form a polygonal contour, the peripheral walls comprising at least one pair of peripheral walls fixed to the first grid part and extending along opposite sides of the first grid part.

6. The grid according to claim 5 wherein the at least one peripheral wall fixed to the first grid part has a tooth for locking the grid parts in the closed configuration, the tooth being capable of snapping onto the second grid part as the grid parts are brought together.

7. The grid according to claim 1 wherein the first and second grid part has at least one passage for a guide thimble, the guide thimble for receiving a cluster rod, the first grid part being capable of receiving the guide thimble with transverse clearance in at least one transverse direction of clamping of the rods between the first and second grid parts.

8. The grid according to claim 1 wherein each of the at least first and second grid parts are formed of first plates and second plates, the second plates intersecting with the first plates.

9. The grid according to claim 1 wherein the at least two grid parts are in pairs, a first pair being the first and second grid part and further comprising a second pair, the first pair of grid parts clamping the rods in a first transverse direction and the second pair of grid parts clamping the rods in a second transverse direction, the second transverse direction being different from the first transverse direction.

10. The grid according to claim 9 wherein the first grid part of the first pair of grid parts is fixed to a first grid part of the second pair of grid parts.

11. A nuclear fuel rod spacer framework for a nuclear fuel assembly, comprising a plurality of spacer grids for rods of a bundle of rods, the spacer grids being distributed along the rods at a distance from one another, at least one of the spacer grids being the spacer grid according to claim 1.

12. A nuclear fuel assembly, comprising a bundle of nuclear fuel rods and a spacer framework for the rods, the framework being according to claim 11.

13. The nuclear fuel rod spacer grid as recited in claim 1 wherein each of the first and second grid parts define cells therein, the cells of the second grid part being movable relative to the cells of the first grid part in the at least one transverse direction between the open configuration and the closed configuration.

14. The nuclear fuel rod spacer grid as recited in claim 13 wherein the second grid part is movable longitudinally to move the cells of the second grid part away from the cells of the first grid part from the closed configuration and into the open configuration, the second grid part being movable longitudinally to move the cells of the second grid part toward the cells of the first grid part from the open configuration and into the closed configuration.

15. The nuclear fuel rod spacer grid as recited in claim 1 wherein the second grid part is disconnected from the immobilization elements in the open configuration.

16. The nuclear fuel rod spacer grid as recited in claim 1 wherein in the closed configuration, the first grid part and the second grid part clamp a longitudinal portion of at least one of the rods such that the first grid part clamps a first circumferential portion of the longitudinal portion and the second grid part clamps a second circumferential portion of the longitudinal portion opposite the first circumferential portion.

17. The nuclear fuel rod spacer grid as recited in claim 1 wherein in the closed configuration, the first grid part and the second grid part are positioned such that the first grid part clamps each rod in a first transverse direction and the second grid part clamps each rod in a second transverse direction opposite the first transverse direction.

18. The nuclear fuel rod spacer grid as recited in claim 1 wherein during movement in the closed configuration, the second grid part moves longitudinally along the rods and gradually clamps the rods with the first grid part.

19. A nuclear fuel rod spacer grid for a fuel assembly, the nuclear fuel rod spacer grid comprising:

at least two meshed grid parts including a first grid part and a second grid part, the first and second grid parts being superposed in a longitudinal direction, the second grid part being movable in the longitudinal direction relative to the first grid part in and out of a transverse plane between an open configuration for insertion of nuclear fuel rods in the longitudinal direction through the first and second grid parts, and a closed configuration allowing each rod inserted through the first and second grid parts to be clamped transversely between the grid parts, the first and second grid parts aligned coincident with each other in the transverse plane in the closed configuration such that an upper surface of the first grid part contacts a lower surface of the second grid part at the transverse plane in the closed configuration and the upper surface of the first grid part does not contact the lower surface of the second grid part at the transverse plane in the open configuration, and immobilization elements for transversely immobilizing the first and second grid parts in the closed configuration, the immobilization elements being arranged to come into engagement as the superposed first and second grid parts are brought together in the longitudinal direction.

20. A nuclear fuel rod spacer grid for a fuel assembly, the nuclear fuel rod spacer grid comprising:

at least two meshed grid parts including a first grid part and a second grid part, the first and second grid parts being superposed in a longitudinal direction, each of the first and second grid parts extending in a transverse plane, the second grid part being movable toward and away from the first grid part such that the first and second grid parts have an open configuration where the second grid part is spaced away from the first grid part for insertion of nuclear fuel rods in the longitudinal direction through the first and second grid parts, and a closed configuration where the second grid part is brought together with the first grid part and each rod inserted through the first and second grid parts is clamped transversely between the grid parts, and immobilization elements for transversely immobilizing the first and second grid parts in the closed configuration, the first grid part being fixed to the immobilization elements in both the open and closed configurations, the immobilization elements being arranged to come into engagement with the second grid part in the closed configuration, the second grid part being spaced from the immobilization elements in the open configuration.

* * * * *